United States Patent
Townsend

(10) Patent No.: US 7,566,061 B2
(45) Date of Patent: Jul. 28, 2009

(54) WORKPIECE GRIPPING APPARATUS

(75) Inventor: Charles W. Townsend, Little Rock, AR (US)

(73) Assignee: SMW Autoblok Corporation, Wheeling, IL (US)

( * ) Notice: Subject to any disclaimer, the term of this patent is extended or adjusted under 35 U.S.C. 154(b) by 349 days.

(21) Appl. No.: 11/385,068

(22) Filed: Mar. 21, 2006

(65) Prior Publication Data
US 2007/0235953 A1    Oct. 11, 2007

(51) Int. Cl.
*B23B 31/171* (2006.01)

(52) U.S. Cl. .................. 279/5; 279/110; 279/123

(58) Field of Classification Search ................. 279/4.1, 279/4.12, 121–123, 5, 57; 269/66, 218, 229, 269/233; *B23B 31/167, 31/171*
See application file for complete search history.

(56) References Cited

U.S. PATENT DOCUMENTS

| | | | | |
|---|---|---|---|---|
| 57,447 A * | 8/1866 | Stockmar | .................. | 269/6 |
| 460,883 A * | 10/1891 | Nugent | .................. | 408/105 |
| 919,971 A * | 4/1909 | Smith | .................. | 269/160 |
| 1,403,589 A * | 1/1922 | Cinquini | .................. | 81/3.7 |
| 1,509,061 A * | 9/1924 | Hardwicke | .................. | 279/60 |
| 2,362,071 A * | 11/1944 | Hunziker | .................. | 279/5 |
| 4,155,564 A * | 5/1979 | Benjamin et al. | ........... | 279/121 |
| 7,234,376 B2 * | 6/2007 | Bader | .................. | 81/55 |

FOREIGN PATENT DOCUMENTS

GB    2103124 A  *  2/1983

* cited by examiner

*Primary Examiner*—David P Bryant
*Assistant Examiner*—Eric A Gates
(74) *Attorney, Agent, or Firm*—Robert W. Becker & Associates; Robert W. Becker

(57) ABSTRACT

A workpiece gripping apparatus comprising a base, two centering jaws displaceably guided on the base so as to be movable toward and away from one another, and an actuator jaw displaceably guided on both of the centering jaws. The actuator jaw is movable toward and away from the base, with movement of the actuator jaw causing movement of both of the centering jaws, which are adapted to center a workpiece between them.

11 Claims, 5 Drawing Sheets

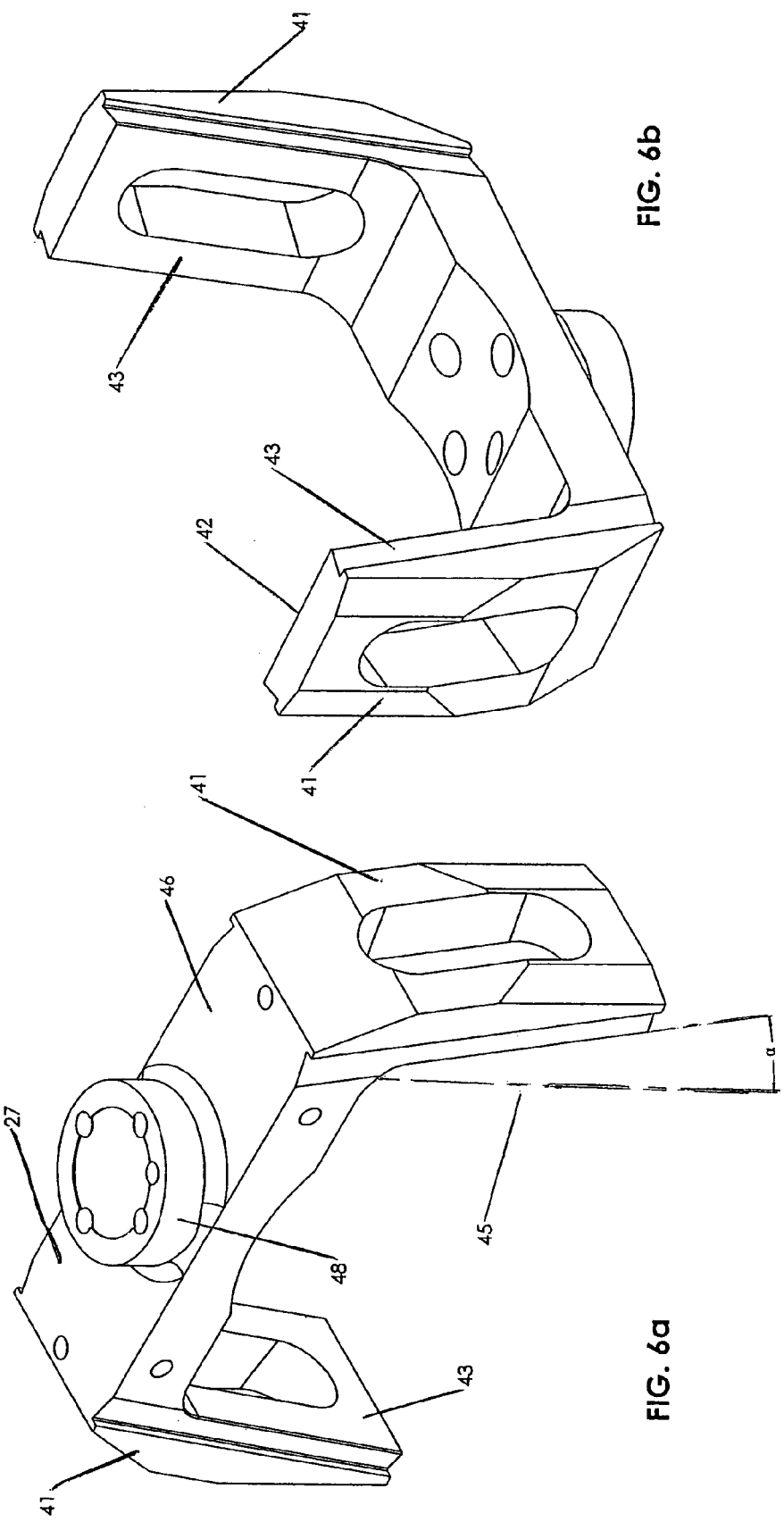

WORKPIECE GRIPPING APPARATUS

BACKGROUND OF THE INVENTION

The present invention relates to a workpiece gripping apparatus, especially for an indexing chuck.

Indexing chucks have been known for about 50 years, and allow various faces of a workpiece to be machined on a lathe without having to release the workpiece from the chuck and to reclamp it. With typical known indexing chucks, the top jaw, which is attached to the clamping piston of the indexing chuck, moves only in the vertical direction to provide clamping for the workpiece. However, since the bottom jaw is fixed in the vertical position, the two jaws are not able to self-center a workpiece in the vertical direction. Such indexing chucks employ one master clamping jaw, making them single jaw clamping chucks. In order to properly center the workpiece in such an indexing chuck, one relies on the symmetrical and concentric nature of the workpiece itself. Unfortunately, although different casting lots of workpieces generally have similar centerlines or a similar deviation from the centerline, these centerlines are often not concentric. This is compensated for by placing under the indexing jaw a washer that has been ground to the size required for raising the indexing jaw a sufficient amount for bringing the workpiece on centerline. Although placing a ground washer between the indexing jaw and the indexing master jaw of the chuck works well when handling a batch of workpieces having similar characteristics of size and concentricity, when the workpiece characteristics are not consistent from one piece to another, a single ground washer will not be sufficient to bring workpieces having great size variations onto a common centerline for machining. This is a common limitation of the known indexing chuck technology, and is one of the great shortcomings of the use of a single jaw clamping chuck.

It is therefore an object of the present application to make it possible to self-center workpieces, and in particular workpieces having unacceptably large external differences that prevent such workpieces from being properly clamped on a common centerline in a single jaw indexing chuck without the need to constantly change a centering washer mounted under the indexing jaw.

BRIEF DESCRIPTION OF THE DRAWINGS

This object, and other objects and advantages of the present invention, will appear more clearly from the following specification in conjunction with the accompanying schematic drawings, in which:

FIGS. 6a & 6b are different views of the actuator jaw of the workpiece gripping apparatus of FIG. 3.

SUMMARY OF THE INVENTION

The workpiece gripping apparatus of the present application comprises a base; two centering jaws displaceably guided on the base so as to be movable toward and away from one another, wherein the centering jaws are adapted to center a workpiece between them; and an actuator jaw that is displaceably guided on both of the centering jaws, wherein the actuator jaw is movable toward and away from the base, with movement of the actuator jaw causing movement of both of the centering jaws.

The present invention provides a method for self-centering a workpiece. This is accomplished by placing the workpiece on the base of the workpiece gripping apparatus. Thereafter, the two centering jaws thereof, which are displaceably guided on the base, are moved toward one another by moving the actuator jaw, which is displaceably guided on both of the centering jaws, toward the base, with such movement of the two centering jaws toward one another effecting a centering of the workpiece between them.

It should be noted that the position descriptions "vertical" and "horizontal" used in the present application are descriptive for reference purposes only to the accompanying drawings. Since a chuck is a rotating clamping device, and during its operation attains positions in the full 360° rotational spectrum, the terms vertical and horizontal as used herein refer to the chuck in its 0° (twelve o'clock) or loading position. Normal loading takes place with the clamping piston of the indexing chuck in the 0° (twelve o'clock) or vertical position.

Further specific features of the present invention will be described in detail subsequently.

DESCRIPTION OF SPECIFIC EMBODIMENTS

The following description of the workpiece gripping apparatus of the present invention will be made in conjunction with its application as part of an indexing chuck, although it is to be understood that the inventive workpiece gripping apparatus could also be used with any other device where a workpiece is to be gripped or clamped in such a way that the workpiece will be centered.

Figure 1:
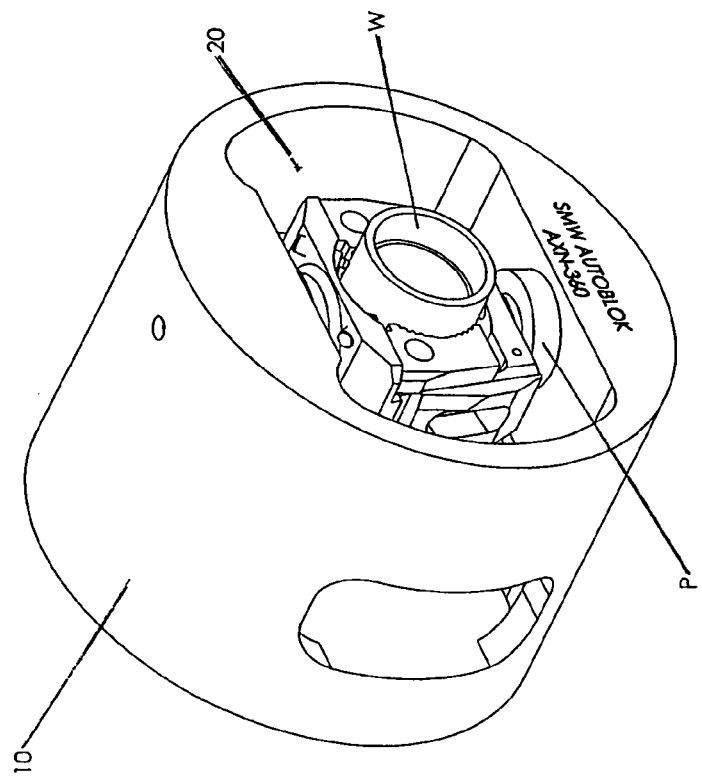
FIGS. 1 and 2 are perspective views, in different positions, of a workpiece gripping apparatus according to the present application installed in an indexing chuck.
Figure 2:
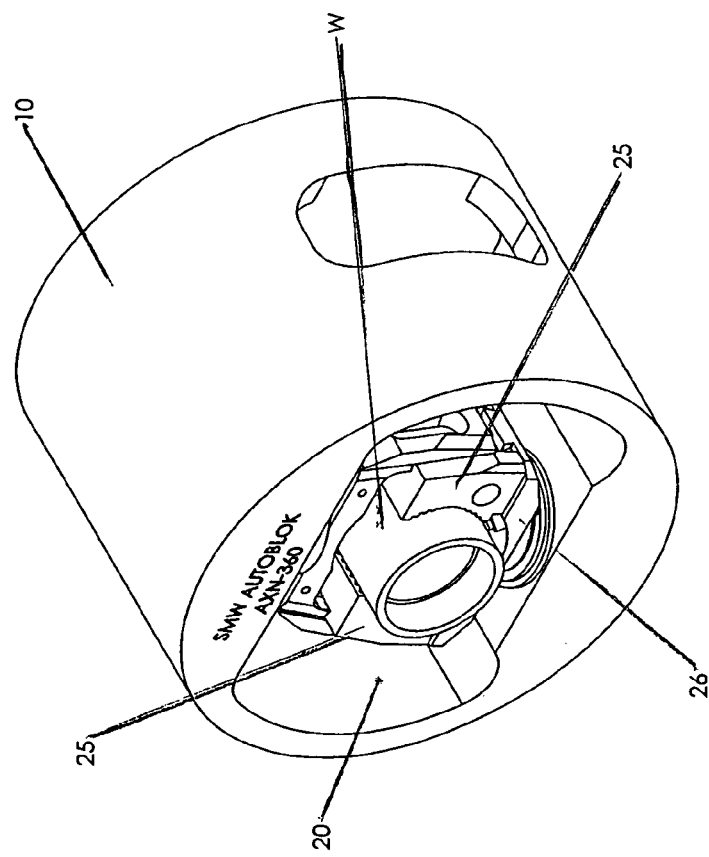

Referring now to the drawings in detail, FIGS. 1 and 2 show the workpiece gripping apparatus, which is designated generally by the reference numeral 20, installed on, and forming part of, an indexing chuck 10. The workpiece gripping apparatus 20 is shown gripping a workpiece W, which is clamped in the workpiece gripping apparatus in a centered manner. In particular, as mentioned previously, the workpiece gripping apparatus 20 of the present application makes it possible to automatically center a workpiece between the two clamping or centering jaws 25.

Figure 3:
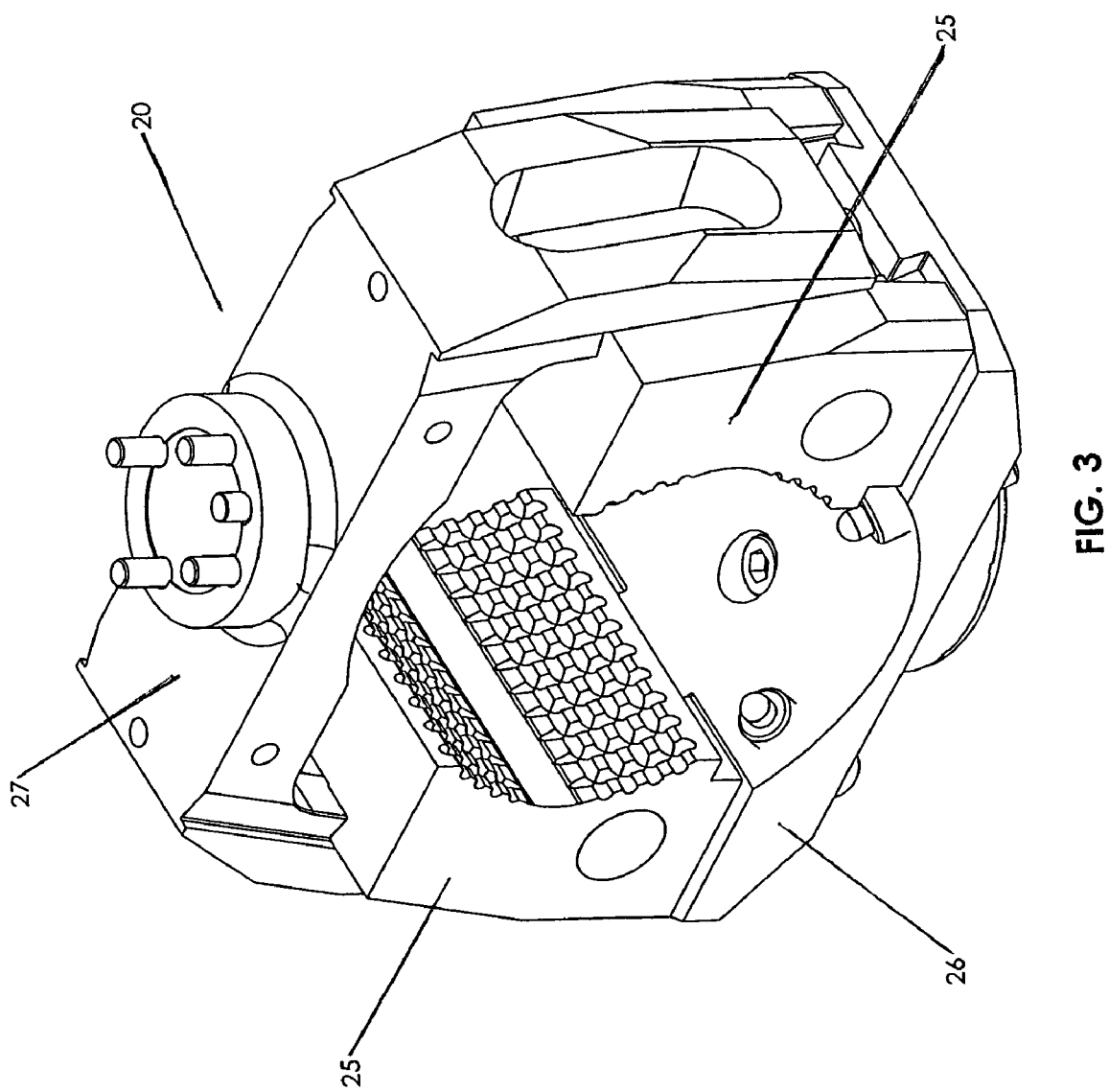
FIG. 3 shows the workpiece gripping apparatus in an assembled state.

As shown in FIG. 3, the workpiece gripping apparatus 20 includes a base 26, which is secured, for example on a frame, bed plate, or other support member, such that it is fixed or stationary relative to the centering jaws 25 and an actuator jaw 27, yet permits the entire workpiece gripping assembly to be rotatable to allow different portions of the workpiece to be presented to a machining tool (see FIG. 2). As will be described in detail subsequently, the centering jaws 25 are displaceably guided on the base 26 so as to be movable toward and away from one another, namely horizontally in the illustrated position. A further clamping or actuator jaw 27 is displaceably guided on both of the centering jaws 25 such that the actuator jaw 27 is movable toward and away from the base 26, namely vertically in the illustrated position. Movement of the actuator jaw 27 toward the base 26, in the embodiment illustrated in the drawings, causes movement of both of the centering jaws 25 toward one another, which in turn results in an automatic self-centering of a workpiece between the centering jaws 25.

Figure 4B:
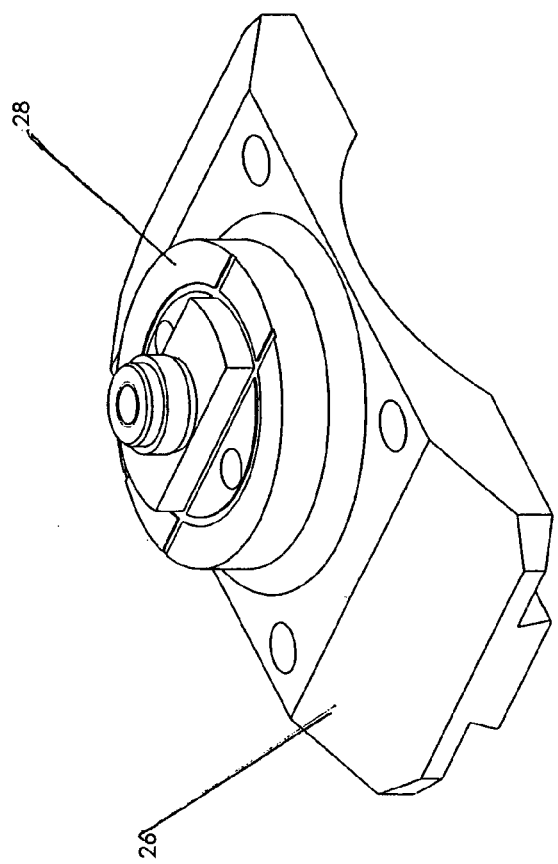
FIGS. 4a & 4b are two views of the base of the workpiece gripping apparatus of FIG. 2.
Figure 4A:
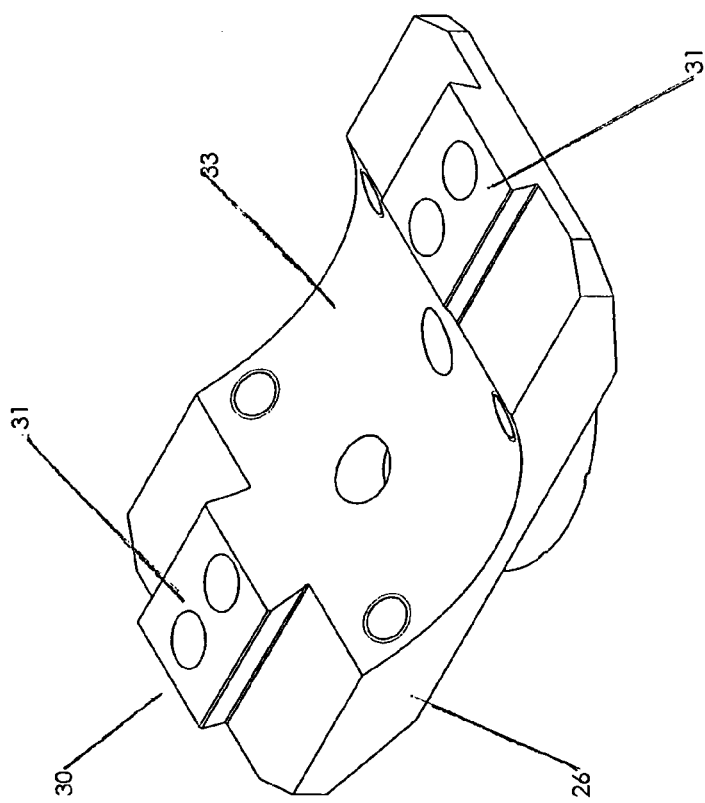

The base 26 is shown in detail in FIGS. 4a and 4b. In FIG. 4b, which shows the underside of the base 26, attachment means 28 are provided for securing the base 26 to an appropriate support member. FIG. 4a shows one exemplary embodiment of a means 30 for effecting the displaceable guidance of the two centering jaws 25 on the base 26. In the illustrated embodiment, the means 30 is in the form of two external or projecting dovetail members 31, also known as flaring tenens, which cooperate with corresponding guide means on the centering jaws 25, as will be described in detail subsequently. A respective dovetail member 31 is provided on each side of a curved recess 33 of the base 26, in other words, one dovetail member 31 is provided for each of the two centering jaws 25.

Figure 5B:
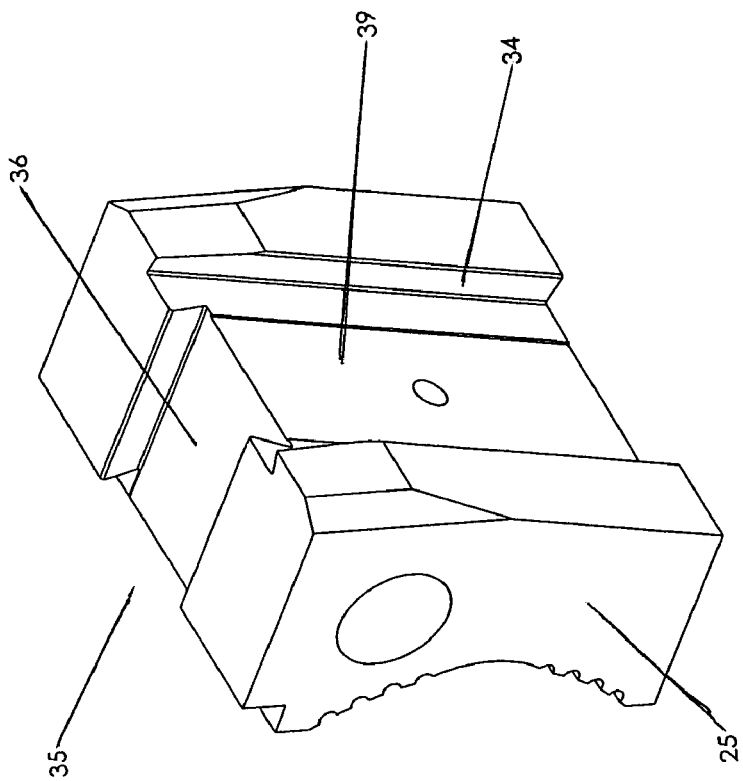
FIGS. 5a & 5b are different views of one of the centering jaws of the workpiece gripping apparatus of FIG. 3.
Figure 5A:
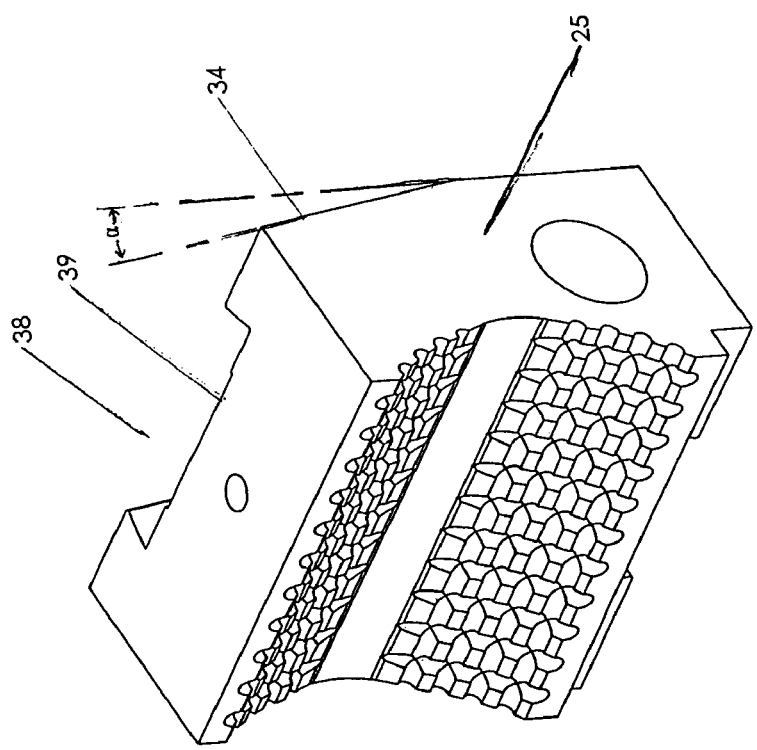

FIGS. 5a and 5b show an exemplary embodiment of one of the centering jaws 25. FIG. 5b, which shows the underside as well as the outwardly facing side 34 of the centering jaw 25, illustrates the means 35 that cooperate with the means 30 of the base 26 for effecting the displaceable guidance of the two centering jaws 25 on the base 26. In the illustrated embodiment, the means 35 is in the form of two internal or recessed dovetail portions 36, also known as grooves or fitting mortises, which cooperate with the projecting dovetail members 31 of the base 26 in such a way that they inter-engage or mate with one another. The cooperating dovetail members 31 and dovetail portions 36 permit movement of the two centering jaws 25 toward and away from one another, with actuation of the movement of the centering jaws 25 being effected by the actuator jaw 27 in a manner to be described in detail subsequently.

Although in the illustrated embodiment the projecting dovetail members of the cooperating guide means 30 and 35 are shown as being disposed on the base 26, while the recessed dovetail portions are shown disposed on the two centering jaws 25, it will be understood by one of skill in the art that the reverse situation could also be provided. In other words, the projecting dovetail members could be disposed on the centering jaws 25, while the cooperating recessed dovetail portions could be provided on the base 26.

Each of the centering jaws 25 is also provided, on the outwardly facing side 34, with a means 38 for effecting displaceable guidance of the actuator jaw 27 on the two centering jaws 25. In the exemplary embodiment illustrated in FIG. 5a, the means 38 is in the form of two internal or recessed dovetail portions 39 that cooperates with a corresponding means provided on the actuator jaw 27, as will be described in detail subsequently.

FIGS. 6a and 6b illustrate one exemplary embodiment of the actuator jaw 27. As can be seen both from the underside view of FIG. 6b and the position of the actuator jaw 27 illustrated in FIG. 6a, which corresponds to the position shown in FIG. 3, the actuator jaw 27 has two oppositely disposed arms 41, which extend in a direction toward the base 26. Each of the arms 41 is provided with a means 42 that cooperates with a respective one of the means 38 on the centering jaws 25 for effecting the displaceable guidance of the actuator jaw 27 on the two centering jaws 25. In the illustrated embodiment, each of the means 42 is in the form of an external or projecting dovetail member 43 that cooperates with the corresponding recessed dovetail portion 39 of the centering jaws 25.

As can be seen from FIGS. 6a and 6b, each of the arms 41 of the actuator jaw 27 extends at an angle α relative to a line 45 that in turn extends perpendicular to the plane of the crosspiece 46 that interconnects the two arms 41. In particular, the arms 41 extend outwardly from the crosspiece 46 at the angle α, which is preferably 10°. As can be seen in FIGS. 5a and 5b, the outwardly facing sides 34 of the centering jaws 25, on the other hand, are angled inwardly at the same angle α. In view of the corresponding angling of the arms 41 of the actuator jaw 27 on the one hand, and of the outwardly facing sides 34 of the centering jaws 25 on the other hand, a vertical movement of the actuator jaw 27 toward the base 26 results in a horizontal movement of the two centering jaws 25 toward one another, whereas a vertical movement of the actuator jaw 27 away from the base 26 results in a horizontal movement of the two centering jaws away from one another.

Instead of effecting movement of the centering jaws 25 perpendicular to the direction of movement of the actuator jaw 27 by means of an angling of the arms 41 and cooperating outwardly facing sides 34, the depth of the recesses 39 of the centering jaws 25 and the thickness of the cooperating projecting dovetail members 43 of the actuator jaw 27 could be appropriately varied, i.e. angled, from one end to the other.

Again, although the projecting dovetail members of the cooperating guide means 38 and 42 have been shown as being disposed on the actuator jaw 27, while the recessed dovetail portions have been shown as being disposed on the centering jaws 25, it will be understood by one of skill in the art that the reverse situation could exist.

Furthermore, instead of cooperating, inter-engaging, projecting dovetail members and recessed dovetail portions, any other suitable inter-engaging guide means could be utilized, such as, by way of example only, a rail or splined arrangement, a hook type arrangement, where all of the edges are square and captivation is accomplished with a hook on both parts, a slot type arrangement, which is similar to the hook type arrangement, with all of the edges being square and captivation being accomplished with a slot on one part and a hook on the other part with a gibb holding it in the slot, and an angle or pecker pin arrangement, which comprises an angular pin and an angular hole for driving the jaws in and out; this latter type of arrangement is used in conjunction with another type of guide means for guiding the jaws on the base.

The workpiece gripping apparatus of the present application, in conjunction with an indexing chuck, operates as follows. A workpiece W is placed on the base 26 between the two centering jaws 25 (FIG. 1). Thereupon, the clamping piston P (FIG. 2) of the indexing chuck 10, which is connected to the actuator jaw 27 via the connection means 48 (FIG. 6a) thereof, is actuated. This causes a vertical, downward movement of the actuator jaw 27 toward the base 26. As a result of the inter-engaging guide means 38 and 42 on the one hand, and 30 and 35 on the other hand, the centering jaws 25 move toward one another, thereby effecting the aforementioned self-centered clamping of the workpiece W between them (FIG. 2). The workpiece W can then be reliably machined. After all desired machining has been accomplished on the workpiece W, the workpiece is removed by actuating the clamping piston P in the opposite direction in order to reverse the aforementioned steps.

The present invention is, of course, in no way restricted to the specific disclosure of the specification and drawings, but also encompasses any modifications within the scope of the appended claims.

What I claim is:

1. A workpiece gripping apparatus for an indexing chuck, comprising:

a base mounted on the indexing chuck;

two centering jaws displaceably guided on said base so as to be movable toward and away from one another, wherein said centering jaws are each a monolithic piece and are adapted to center a workpiece between them; and an actuator jaw displaceably guided on both of said centering jaws, wherein said actuator jaw is a monolithic piece that is movable toward and away from said base, and wherein movement of said actuator jaw causes movement of both of said centering jaws.

2. A workpiece gripping apparatus according to claim 1, wherein said base is fixed or stationary in the indexing chuck, and wherein said centering jaws and said actuator jaw are movable relative to said base.

3. A workpiece gripping apparatus according to claim 1, wherein first cooperating guide means are provided on said base and said centering jaws, and second cooperating guide means are provided on said centering jaws and said actuator jaw.

4. A workpiece gripping apparatus according to claim 3, wherein said first cooperating guide means comprise projecting dovetail members on said base or said centering jaws, and recessed dovetail portions on said centering jaws or on said base, and wherein said projecting dovetail members and said recessed dovetail portions interengage one another.

5. A workpiece gripping apparatus according to claim 4, wherein said second cooperating guide means comprise recessed dovetail portions on said centering jaws or on said actuator jaw, and a projecting dovetail member on said actuator jaw or on each of said centering jaws, and wherein said recessed dovetail portions and said projecting dovetail member interengage one another.

6. A workpiece gripping apparatus according to claim 1, wherein said actuator jaw has a U-shaped configuration, including two arms that are interconnected by a crosspiece, and wherein said arms extend from said crosspiece toward said base.

7. A workpiece gripping apparatus according to claim 6, wherein in a direction toward said base, said arms are angled away from one another.

8. A workpiece gripping apparatus according to claim 7, wherein each of said centering jaws has an outwardly facing side, and wherein in a direction toward said actuator jaw, said outwardly facing sides are angled toward one another at an angle that corresponds to said angling of said arms away from one another.

9. A workpiece gripping apparatus according to claim 1, wherein movement of said actuator jaw is substantially perpendicular to the movement of said centering jaws caused thereby.

10. A workpiece gripping apparatus according to claim 9, wherein said workpiece gripping apparatus is part of an indexing chuck having a clamping piston for effecting movement of said actuator jaw toward and away from said base.

11. A method of self-centering a workpiece in an indexing chuck, including the steps of:
mounting a base on the indexing chuck;
placing a workpiece on the base; and
effecting movement of two centering jaws that are each a monolithic piece and are displaceably guided on said base toward one another by moving an actuator jaw that is a monolithic piece and is displaceably guided on said centering jaws toward said base, wherein said movement of said centering jaws toward one another effects centering of said workpiece between them.

* * * * *